United States Patent
Jung et al.

(10) Patent No.: US 9,064,463 B2
(45) Date of Patent: Jun. 23, 2015

(54) ELECTROWETTING DISPLAY DEVICE

(75) Inventors: Kwang-chul Jung, Seongnam-si (KR); Meehye Jung, Suwon-si (KR); Uk Chul Choi, Cheonan-si (KR); Hyun Sik Hwang, Hwaseong-si (KR)

(73) Assignee: Amazon Technologies, Inc., Reno, NV (US)

( * ) Notice: Subject to any disclaimer, the term of this patent is extended or adjusted under 35 U.S.C. 154(b) by 249 days.

(21) Appl. No.: 13/607,607

(22) Filed: Sep. 7, 2012

(65) Prior Publication Data

US 2013/0257914 A1   Oct. 3, 2013

(30) Foreign Application Priority Data

Mar. 27, 2012  (KR) ......................... 10-2012-0031158

(51) Int. Cl.
*G09G 3/20* (2006.01)
*G09G 3/34* (2006.01)
*G02B 26/00* (2006.01)

(52) U.S. Cl.
CPC .............. *G09G 3/348* (2013.01); *G02B 26/005* (2013.01); *G09G 2300/0426* (2013.01); *G09G 2300/0439* (2013.01); *G09G 2310/062* (2013.01)

(58) Field of Classification Search
CPC . G09G 3/348; G09G 2310/062; G02B 26/005
USPC ............... 345/55, 84, 107; 359/228, 290–296
See application file for complete search history.

(56) References Cited

U.S. PATENT DOCUMENTS

| | | | |
|---|---|---|---|
| 6,900,924 B2 | 5/2005 | Goden | |
| 7,224,534 B2 | 5/2007 | Ootsuka et al. | |
| 7,359,108 B2 | 4/2008 | Hayes et al. | |
| 7,872,693 B2 | 1/2011 | Chen | |
| 2004/0231987 A1 | 11/2004 | Sterling et al. | |
| 2006/0285067 A1* | 12/2006 | Kim | 349/187 |
| 2008/0204370 A1* | 8/2008 | Feenstra et al. | 345/60 |
| 2008/0224970 A1* | 9/2008 | Van Den Biggelaar et al. | 345/84 |
| 2009/0027751 A1* | 1/2009 | Chen et al. | 359/228 |
| 2009/0103159 A1* | 4/2009 | Cheng et al. | 359/228 |
| 2009/0166637 A1* | 7/2009 | Park et al. | 257/71 |
| 2009/0316253 A1* | 12/2009 | Fairley et al. | 359/292 |
| 2010/0053144 A1* | 3/2010 | Akimoto et al. | 345/213 |
| 2011/0058245 A1* | 3/2011 | Wang et al. | 359/290 |
| 2012/0007608 A1* | 1/2012 | Hadwen et al. | 324/649 |
| 2012/0194492 A1* | 8/2012 | Hadwen et al. | 345/207 |

FOREIGN PATENT DOCUMENTS

| | | |
|---|---|---|
| JP | 2009-064444 A | 3/2009 |
| JP | 2009-523257 A | 6/2009 |

(Continued)

*Primary Examiner* — Alexander Eisen
*Assistant Examiner* — Abhishek Sarma
(74) *Attorney, Agent, or Firm* — Lee & Hayes, PLLC (57) ABSTRACT

A display device includes a display capacitor, a data switching device, and a reset switching device. The data switching device may transmit a data voltage to the display capacitor in response to an activating gate signal that is applied to the data switching device for a activating gate signal duration. The reset switching device may transmit a storage voltage to the display capacitor in response to an activating reset signal that is applied to the first reset switching device for an activating reset signal duration. The storage voltage is configured for resetting a pixel associated with the first display capacitor. The activating reset signal duration is longer than the activating gate signal duration.

20 Claims, 7 Drawing Sheets

(56) References Cited

FOREIGN PATENT DOCUMENTS

| | | |
|---|---|---|
| JP | 2009-151152 A | 7/2009 |
| JP | 2010-503013 A | 1/2010 |
| JP | 2010-177301 | 8/2010 |
| JP | 2010-204665 A | 9/2010 |
| KR | 1020050005094 A | 1/2005 |
| KR | 1020050052648 A | 6/2005 |
| KR | 1020080109229 A | 12/2006 |
| KR | 100782471 B1 | 11/2007 |
| KR | 10-0904310 B1 | 12/2007 |
| KR | 1020090118768 A | 11/2009 |
| KR | 1020090129045 A | 12/2009 |
| KR | 1020100008200 A | 1/2010 |
| KR | 1020100040650 A | 4/2010 |
| KR | 1020110103371 A | 9/2011 |

* cited by examiner

ELECTROWETTING DISPLAY DEVICE

CROSS-REFERENCE TO RELATED APPLICATION

This U.S. non-provisional patent application claims priority and benefit under 35 U.S.C. §119 of Korean Patent Application No. 10-2012-0031158, filed on Mar. 27, 2012, the contents of which are hereby incorporated by reference.

BACKGROUND

1. Field of the Invention

The present invention relates to an electrowetting display device. More particularly, the present disclosure relates to an electrowetting display device capable of minimizing energy consumption and/or capable of enhancing resolution.

2. Description of the Related Art

Typically, an electrowetting display device may have advantageous characteristics, such as fast response speed, high visibility, etc., in comparison with a liquid crystal display.

In a typical electrowetting display device, each pixel includes black oil to block light. The black oil may be moved to a side of the pixel by a data voltage applied to the pixel. As a result, a portion of the pixel is not covered by the black oil, and light may pass through the portion of the pixel for displaying a gray-scale. Nevertheless, although the data voltage is uniformly applied to the pixel, a back-flow phenomenon, in which the black oil slowly returns to its original position, may still occur. Due to the back-flow phenomenon, the gray-scale may appear abnormally.

In order to prevent the back-flow phenomenon, the electrowetting display device may utilize a gate signal having a frequency higher than that of the gate signal utilized by a typical liquid crystal display. Each pixel of the electrowetting display device is forcibly initialized with the high-frequency gate signal in a present frame before the data voltage of a next frame is applied to the pixel. Given the high frequency of the gate signal, the energy consumption in the electrowetting display device may be substantially high, and the application time of the data voltage may be substantially short. As a result, the maximum resolution of the electrowetting display device may be limited.

SUMMARY

One or more embodiments of the invention may be related to display devices capable of minimizing energy consumption and/or displaying image with satisfactory resolution. One or more embodiments of the invention may be related to methods for operating display devices to display images with satisfactory resolution while minimizing energy consumption.

An embodiment of the invention is related to a display device that includes a first display capacitor, a data switching device, and a first reset switching device. The data switching device may transmit a data voltage to the first display capacitor in response to an activating gate signal that is applied to the data switching device for an activating gate signal duration. The first reset switching device configured to transmit a first storage voltage to the first display capacitor in response to a first activating reset signal that is applied to the first reset switching device for a first activating reset signal duration. The first storage voltage may be configured for resetting a pixel associated with the first display capacitor. The first activating reset signal duration may be longer than the activating gate signal duration.

In one or more embodiments, the data switching device may receive the activating gate signal after a wait interval has elapsed following completion of the first activating reset signal duration.

In one or more embodiments, the display device may further include a second display capacitor and a second reset switching device. The second reset switching device may transmit a second storage voltage to the second display capacitor in response to a second activating reset signal that is applied to the second reset switching device for a second activating reset signal duration. The second activating reset signal duration may overlap the first activating reset signal duration.

In one or more embodiments, a length of a time difference between a rising edge of the second activating reset signal and a rising edge of the first activating reset signal may be substantially equal to a length of the activating gate signal duration.

In one or more embodiments, a voltage level of the activating gate signal may be substantially equal to a voltage level of the first activating reset signal.

In one or more embodiments, the display device may further include a fluid. The fluid may cover at least one of the data switching device and the first reset switching device when the data voltage is applied to the first display capacitor. In one or more embodiments, the fluid may be a light-absorbing fluid.

In one or more embodiments, the fluid may cover both the data switching device and the first reset switching device when the data voltage is applied to the first display capacitor.

In one or more embodiments, the display device may further include a first pixel electrode. The first pixel electrode may be a part of the display capacitor. The fluid may cover a first area of the first pixel electrode when the first storage voltage is applied to the first display capacitor. The fluid may not cover the first area of the first pixel electrode when the data voltage is applied to the first display capacitor.

In one or more embodiments, the first pixel electrode may be electrically connected to both a drain electrode of the data switching device and a drain electrode of the first reset switching device.

In one or more embodiments, the fluid may cover a second area of the first pixel electrode when the data voltage is applied to the first display capacitor. The first area of the first pixel electrode may be larger than the second area of the first pixel electrode.

In one or more embodiments, the display device may further include a storage electrode that receives the first storage voltage; the display device may further include a second pixel electrode electrically connected to the storage electrode.

In one or more embodiments, the second pixel electrode may be electrically connected to a source electrode of the first reset switching device.

In one or more embodiments, an edge of the fluid may be disposed at a gap between the first pixel electrode and the second pixel electrode in a plan view of the pixel when the display voltage is applied to the display capacitor.

In one or more embodiments, the fluid may overlap the second pixel electrode when the display voltage is applied to the display capacitor.

In one or more embodiments, the first pixel electrode may be electrically insulted from the storage electrode.

In one or more embodiments, a portion of the fluid may overlap neither of the first pixel electrode and the second pixel electrode when the data voltage is applied to the display capacitor. In one or more embodiments, the portion of the fluid may overlap the data switching device when the data capacitor is applied to the display capacitor.

In one or more embodiments, the second pixel electrode may overlap the first reset switching device.

An embodiment of the invention is related to a method for operating a display device. The display device may include a display capacitor, a reset switching device, and a data switching device. The method may include providing an activating reset signal to the reset switching device for an activating reset signal duration to enable the reset switching device to transmit a storage voltage to the display capacitor, thereby resetting a pixel associated with the display capacitor. The method may further include, after the providing, applying an activating gate signal to the data switching device for an activating gate signal duration to enable the data switching device to transmit a data voltage to the display capacitor, thereby enabling the pixel to display a gray scale. The first activating reset signal duration may be longer than the activating gate signal duration.

One or more embodiments of the invention may be related to an electrowetting display device that includes a display panel. The display panel may include a plurality of gate lines, a plurality of sub-gate lines, a plurality of data lines, and a plurality of pixels, a gate driver that sequentially applies gate signals to the gate lines to drive the pixels in a unit of row, a reset driver that sequentially applies reset gate signals to the sub-gate lines to initialize the pixels in the unit of row, and a data driver that applies data voltages to the pixels through the data lines. Each of the pixels is initialized at every frame in response to a corresponding reset gate signal of the reset gate signal and receives a corresponding data voltage of the data voltages in response to a corresponding gate signal of the gate signals after a predetermined time lapses. A high level period of the reset gate signal is set longer than a high level period of the gate signal.

Each of the pixels displays a black gray-scale in response to the corresponding reset gate signal, and each of the pixels applied with the data voltage displays a gray-scale corresponding to the data voltage.

The high level periods of the reset gate signals are overlapped with each other, the overlapped period is defined as a difference between the high level period of the reset gate signal and the high level period of the gate signal, and the reset gate signal of a present stage is obtained by shifting the reset gate signal of a previous stage to a right side by the high level period of the gate signal.

Each of the pixels includes a storage line that receives a storage voltage, a display capacitor that is charged with a voltage applied thereto, a first thin film transistor that applies the corresponding data voltage provided through the corresponding data line to the display capacitor in response to the corresponding gate signal provided through the corresponding gate line, and a second thin film transistor that applies the storage voltage provided through the storage line to the display capacitor in response to the corresponding reset gate signal provided through the corresponding sub gate line.

The display capacitor receives the data voltage through the first thin film transistor turned on by the gate signal and is charged with a second pixel voltage displaying a gray-scale corresponding to the data voltage.

The display capacitor is charged with a first pixel voltage to display a black gray-scale by the storage voltage applied through the second thin film transistor that is turned on by the reset gate signal.

The display panel includes a first substrate including the gate lines, the data lines, the sub-gate lines, the pixels, and a pixel partition wall that partitions the pixels, a second substrate facing the first substrate and including a common electrode receiving a common voltage, and a fluid layer interposed between the first substrate and the second substrate and including a first fluid layer absorbing a light and a second fluid layer transmitting the light.

Each of the pixels includes a storage line that receives a storage voltage, a first thin film transistor connected to a corresponding gate line and a corresponding data line, a second thin film transistor connected to a corresponding sub gate line and a storage electrode branched from the storage line, a first pixel electrode connected to the first thin film transistor and the second thin film transistor, and a second pixel electrode spaced apart from the first pixel electrode and connected to the second thin film transistor and the storage electrode. The first and second pixel electrodes face the common electrode to form an electric field, the first fluid layer of the pixel receiving the data voltage in response to the gate signal is collected in a portion of the pixel, an area where the first fluid layer is collected includes an area where the second pixel electrode is formed, and the second thin film transistor is overlapped with the area where the first fluid layer is collected.

According one or more embodiments, the reset circuit may initialize the pixel and may enable optimization of signal application durations and frequencies. Advantageously, energy consumption in electrowetting display devices may be minimized, and resolution of displayed images may be enhanced.

In one or more embodiments, the reset circuit may enable optimization of performance of display devices without perceivably reducing transmittance of the display devices.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Hereinafter, the present invention will be explained in detail with reference to the accompanying drawings.

Figure 1:
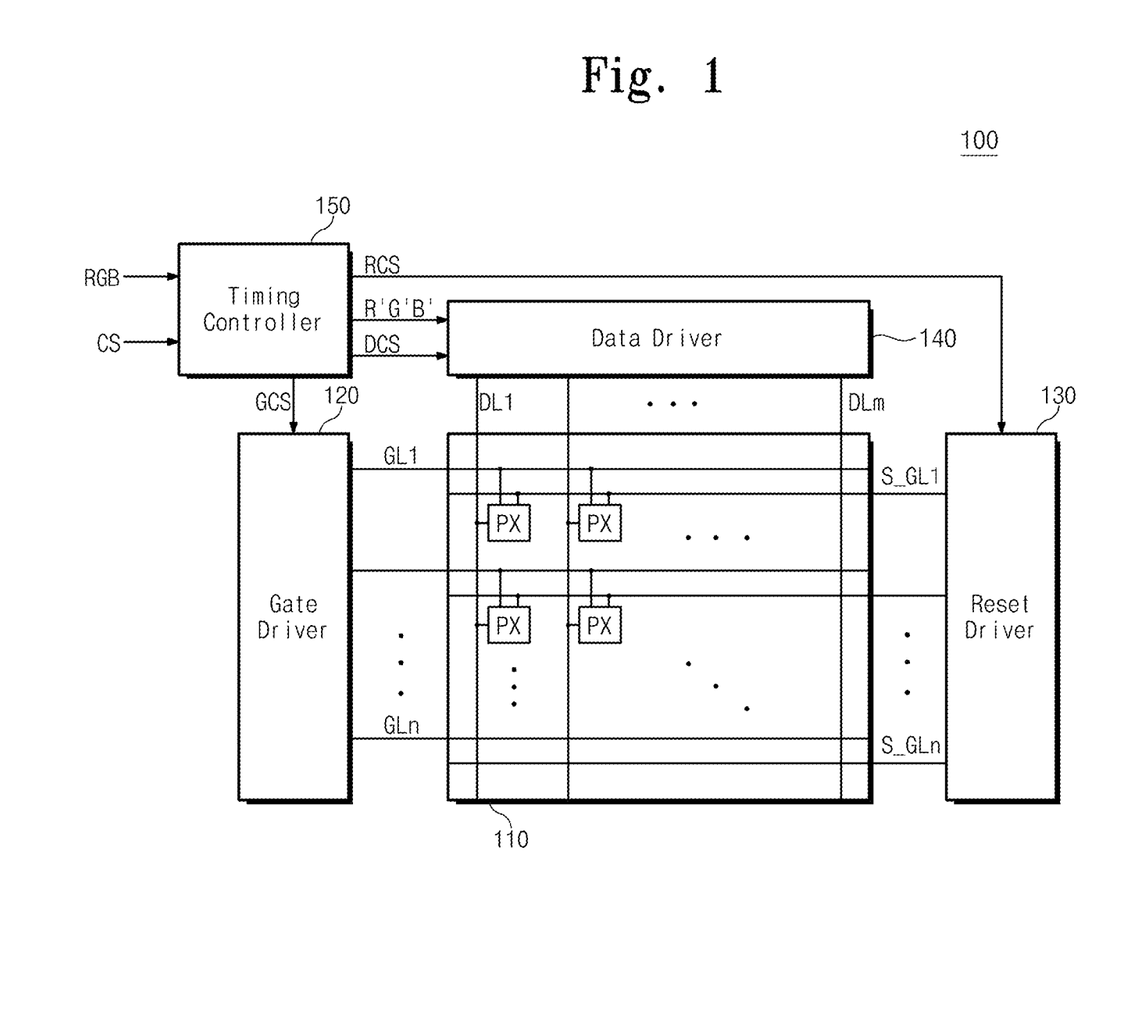
FIG. 1 is a block diagram illustrating an electrowetting display device according to one or more embodiments of the present invention.

FIG. 1 is a block diagram illustrating an electrowetting display device 100 according to one or more embodiments of the present invention.

Referring to FIG. 1, the electrowetting display device 100 includes a display panel 110, a gate driver 120, a reset driver 130, a data driver 140, and a timing controller 150.

The display panel 110 includes a plurality of gate lines GL1 to GLn, a plurality of data lines DL1 to DLm crossing the gate lines GL1 to GLn, a plurality of sub-gate lines S_GL1 to S_GLn arranged substantially in parallel with the gate lines GL1 to GLn and crossing the data lines DL1 to DLm, and a plurality of pixels PX formed in areas defined in association with the gate lines GL1 to GLn and the data lines DL1 to DLm. The pixels PX are arranged in a matrix configuration of n rows by m columns. Although not explicitly illustrated in FIG. 1, the pixels PX may be partitioned by a pixel partition wall, and each of the pixels PX may include a fluid layer contained in a pixel area defined by the pixel partition wall.

The gate lines GL1 to GLn are (e.g., electrically and/or optically) connected to the gate driver 120 and are configured to receive gate signals. The sub-gate lines S_GL1 to S_GLn are connected to the reset driver 130 and are configured to receive reset gate signals. The data lines DL1 to DLm are connected to the data driver 140 and are configured to receive data signals.

The timing controller 150 may receive image signals RGB and a control signal CS from an external device (not illustrated). The timing controller 150 may convert a data format of the image signals RGB to a data format appropriate to an interface between the data driver 140 and the timing controller 150 and may provide the converted image signals R'G'B' to the data driver 140.

In addition, the timing controller 150 may generate a data control signal DCS, a gate control signal GCS, and a reset control signal RCS in response to the control signal CS. The timing controller 150 may apply the data control signal DCS, the gate control signal GCS, and the reset control signal RCS to the data driver 140, the gate driver 120, and the reset driver 130, respectively.

The gate control signal GCS may include a gate clock signal that is used to generate the gate signal. The reset control signal RCS may include a reset gate clock signal. The high level period of the reset control signal RCS may be set longer than the high level period of the gate clock signal. In one or more embodiments, a period of the reset gate clock signal is set longer than a period of the gate clock signal.

The high level of the gate clock signal may be the same as the high level of the reset gate clock signal. Therefore, the timing controller 150 may use the gate clock signal to generate the reset gate clock signal. In one or more embodiments, the timing controller 150 may generate the reset gate clock signal by lengthening the high level period of a copy of the gate click signal.

The gate driver 120 may sequentially output gate signals in response to the gate control signal GCS provided from the timing controller 150. The gate signals may be sequentially applied to the gate lines GL1 to GLn; in response, the pixels PX may be turned on row by row.

The reset driver 130 may sequentially output reset gate signals in response to the reset control signal RCS provided from the timing controller 150. At least two of the reset gate signals output from the reset driver 130 may overlap each other for a predetermined period/duration. The reset gate signals may be sequentially applied to the sub-gate lines S_GL1 to S_GLn so as to reset the pixels PX row by row.

A voltage level of the reset gate signals in the high level period of the reset gate signals may be substantially equal to a voltage level of the gate signals in the high level period of the gate signals. In one or more embodiments, the high level period of each of the reset gate signals is longer than the high level period of each of the gate signals.

Application timings of the reset gate signals and the gate signals may be controlled by the timing controller 150 so that the reset gate signals and the gate signals are sequentially applied to the pixels PX arranged in corresponding rows. The application timing of a reset gate signal and the application timing of a following gate signal may be separated by a predetermined interval. The application timings of the reset gate signals and the gate signals are further described in detail with reference to FIG. 5.

The data driver 140 may convert the image signals R'G'B' to data voltages (or data signals) in response to the data control signal DCS provided from the timing controller 150 and may output the converted data voltages. The data voltages may be applied to the pixels PX through the data lines DL1 to DLm.

Although not illustrated in FIG. 1, the electrowetting display device 100 may further include a backlight unit disposed under the display panel 110 to provide light to the display panel 110. The backlight unit may include a plurality of light sources, each having one or more of a light emitting diode, a cold cathode fluorescent lamp, etc.

Figure 2:
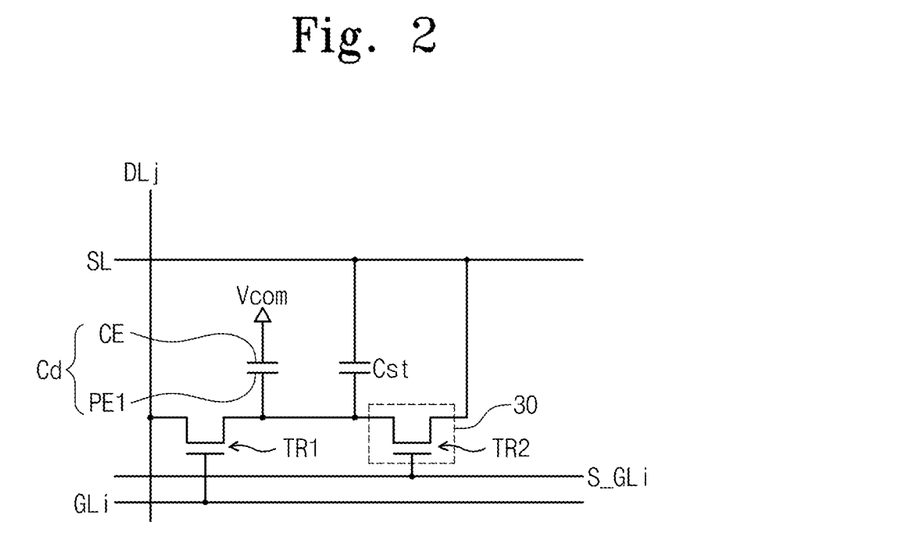
FIG. 2 is an equivalent circuit diagram illustrating a pixel of the electrowetting display device illustrated in FIG. 1.

FIG. 2 is an equivalent circuit diagram illustrating a pixel in the electrowetting display device 100 of FIG. 1. In one or more embodiments, the pixels of the electrowetting device 100 may have substantially the same circuit configuration or may have analogous circuit configurations.

Referring to FIG. 2, the pixel PX is connected to a corresponding gate line GLi among the gate lines GL1 to GLn, a corresponding sub-gate line S_GLi among the sub-gate lines S_GL1 to S_GLn, a corresponding data line DLj among the data lines DL1 to DLm, and a storage line SL that is configured for receiving a storage voltage, wherein i is an integer number that is larger than zero and equal to or smaller than n, and wherein j is an integer number that is larger than zero and equal to or smaller than m.

The pixel PX includes a first thin film transistor TR1, a display capacitor Cd, a storage capacitor Cst, and a reset circuit 30. The reset circuit 30 includes a second thin film transistor TR2. The second thin film transistor TR2 may have a size smaller than the size of the first thin film transistor TR1. The first thin film transistor TR1 may be defined as a first switching device. The second thin film transistor TR2 may be defined as a second switching device.

The first thin film transistor TR1 includes a first gate electrode electrically connected to the gate line GLi, a first source electrode electrically connected to the data line DLj, and a first drain electrode electrically connected to the display capacitor Cd and the storage capacitor Cst.

The second thin film transistor TR2 (which is a part of the reset circuit 30) includes a second gate electrode electrically connected to the sub-gate line S_GLi, a second source electrode electrically connected to the storage line SL, and second drain electrode electrically connected to the storage capacitor Cst and the display capacitor Cd.

The display capacitor Cd may include a first pixel electrode PE1 connected to the first drain electrode of the first thin film transistor TR1 and may include a common electrode CE applied with a common voltage Vcom. The first pixel electrode PE1 and the common electrode CE may be defined as a first electrode and a second electrode of the display capacitor Cd, respectively.

The storage capacitor Cst may include a storage electrode branched from the storage line SL and may include the first drain electrode (which is a part of the first thin film transistor TR1). Additionally or alternatively, the storage capacitor Cst may include the storage electrode and may include the second drain electrode (which is a part of the second thin film transistor TR2).

The display capacitor Cd and the storage capacitor Cst of the pixel PX are further described in detail with reference to FIG. 4.

The reset gate signal may be applied to the second gate electrode (which is a part of the second thin film transistor TR2 in the reset circuit 30) through the sub-gate line S_GLi. A turn-on or turn-off state of the second thin film transistor TR2 may be controlled by the reset gate signal applied to the second gate electrode (which is a part of the second thin film transistor TR2). That is, the reset circuit 30 may be switched by the reset gate signal.

In one or more embodiments, the second thin film transistor TR2 may be turned on by an activating reset gate signal (e.g., a high level voltage). Thus, the reset voltage provided through the storage line SL may be applied to the storage capacitor Cst and the first pixel electrode PE1 through the turned-on second thin film transistor TR2.

The reset voltage may be applied to the first pixel electrode PE1 of the display capacitor Cd, and the common voltage Vcom may be applied to the common electrode CE. In addition, the reset voltage may be applied to the storage electrode and the second drain electrode (which is a part of the second thin film transistor TR2), i.e., both electrodes of the storage capacitor Cst. In one or more embodiments, reset voltage may have substantially the same voltage level as the common voltage Vcom; as a result, the display capacitor Cd and the storage capacitor Cst are not charged. Subsequently, the display capacitor Cd and the storage capacitor Cst may be charged with a first pixel voltage to display a black gray-scale. Accordingly, the pixel PX is initialized (or reset).

After a predetermined time period has lapsed following the application of the activating reset gate signal, the gate signal is applied to the first gate electrode of the first thin film transistor TR1 through the gate line GLi. A turn-on or turn-off state of the first thin film transistor TR1 is controlled by the gate signal applied to the first gate electrode (which is a part of the first thin film transistor TR1).

In one or more embodiments, the first thin film transistor TR1 may be turned on by an activating gate signal (e.g., a high level voltage). The data voltage provided through the data line DLj may be applied to the first pixel electrode PE1 and the storage capacitor Cst through the turned-on first thin film transistor TR1. Therefore, the data voltage may be applied to the first pixel electrode PE1 of the display capacitor Cd. At the same time, the common voltage Vcom may be applied to the common electrode CE.

As a result, the display capacitor Cd may be charged with a second pixel voltage corresponding to a voltage level difference between the data voltage and the common voltage Vcom. Since the data voltage is a voltage for displaying one or more of various gray-scales, the second pixel voltage charged in the display capacitor Cd may be defined as a pixel voltage for displaying a gray-scale corresponding to the data voltage.

The data voltage may be applied to the storage capacitor Cst through the turned-on first thin film transistor TR1. The storage electrode of the storage capacitor Cst may receive the reset voltage through the storage line SL. The reset voltage may have the same voltage level as the common voltage Vcom. Thus, the storage capacitor Cst may be charged with the second pixel voltage, which is configured for displaying the gray-scale corresponding to the data voltage.

Consequently, both the display capacitor Cd and the storage capacitor Cst may be charged with the second pixel voltage, which is configured for displaying the gray-scale corresponding to the data voltage. Thus, the pixel PX displays the gray-scale corresponding to the data voltage.

A movement of a fluid layer of the pixel PX may be controlled by the data voltage and the reset voltage, for the pixel to display the gray-scale. The movement of the fluid layer in the pixel PX according to the application of the gate signal, the reset gate signal, the data voltage, and the reset voltage is described in detail with reference to FIGS. 3 to 7.

As can be appreciated from the discussion provided above, the reset circuit 30 may apply the reset voltage to the pixel in response to the reset gate signal and may initialize the pixel. The pixel may receive the data voltage in response to the gate signal and may display the gray-scale corresponding to the received data voltage. In one or more embodiments, frequencies of the reset gate signal and the gate signal do not interfere with each other, and the reset gate signal and the gate signal are separately applied to the pixel.

In one or more embodiments, the reset gate signal and the gate signal may be set to have optimal time periods to apply the reset voltage and the data voltage. The reset gate signal may substantially prevent or reduce the potential back-flow phenomenon; therefore, there may be no need to set the frequency of the gate signal higher than a frequency of a gate signal used in a conventional liquid crystal display. The optimal time period for the gate signal may be defined as a minimum time period that is required for the pixel to be charged with a data voltage for displaying a desired gray-scale.

Advantageously, the electrowetting display device 100 may require minimum energy consumption. The electrowetting display device 100 may also secure sufficient time for applying the data voltage, thereby advantageously providing a satisfactory image resolution.

Figure 3:
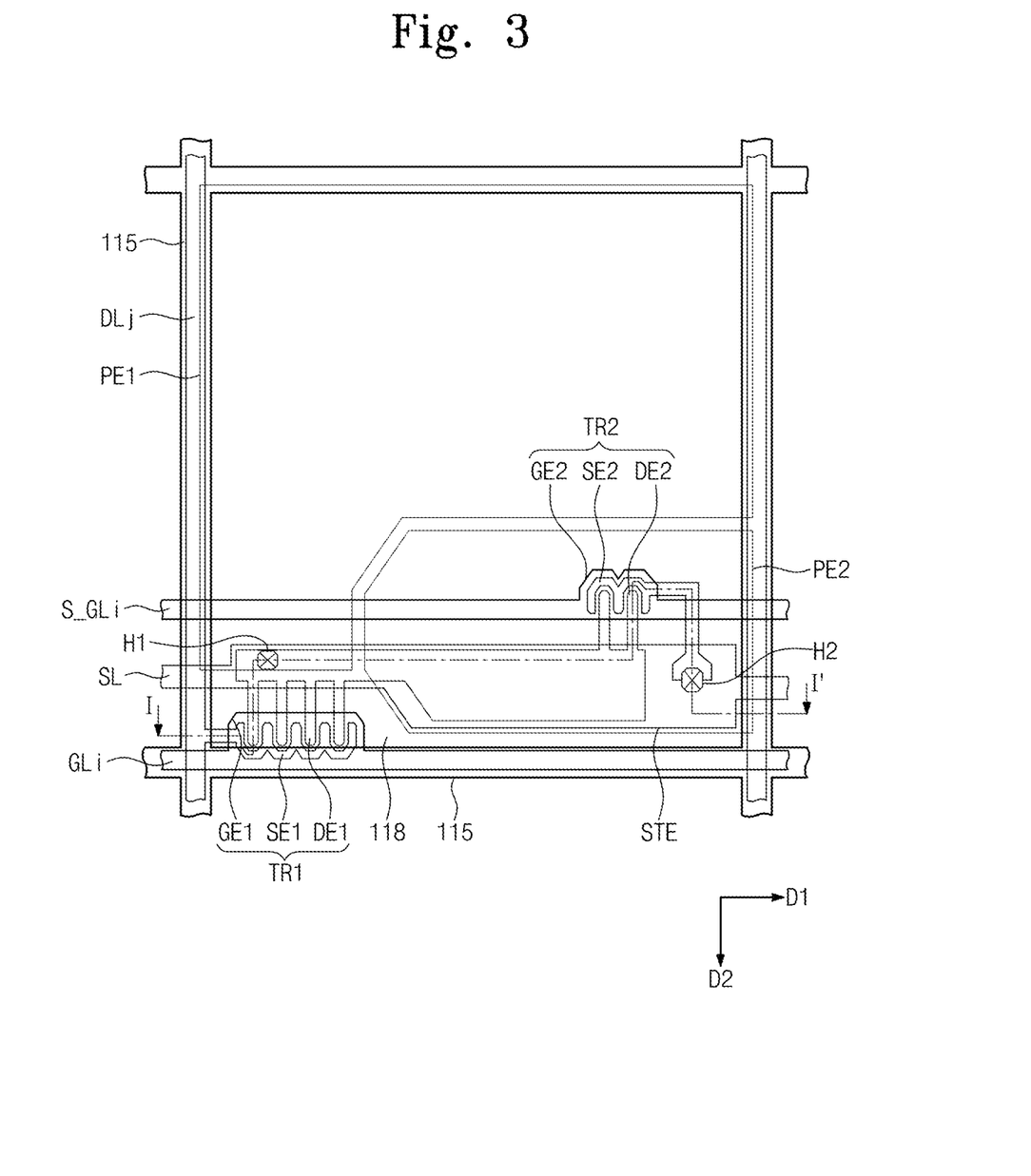
FIG. 3 is a plan view illustrating a layout of a pixel corresponding to the equivalent circuit diagram illustrated in FIG. 2.

FIG. 3 is a plan view illustrating a layout of a pixel corresponding to the equivalent circuit of FIG. 2. FIG. 4 is a cross-sectional view taken along a line I-I' of FIG. 3. In one or more embodiments, the pixels in the electrowetting display device 100 have substantially the same circuit configuration or analogous circuit configurations; therefore, the pixel discussed with reference to FIGS. 3 and 4 may provide sufficient information for other pixels in the electrowetting display device 100.

Figure 4:
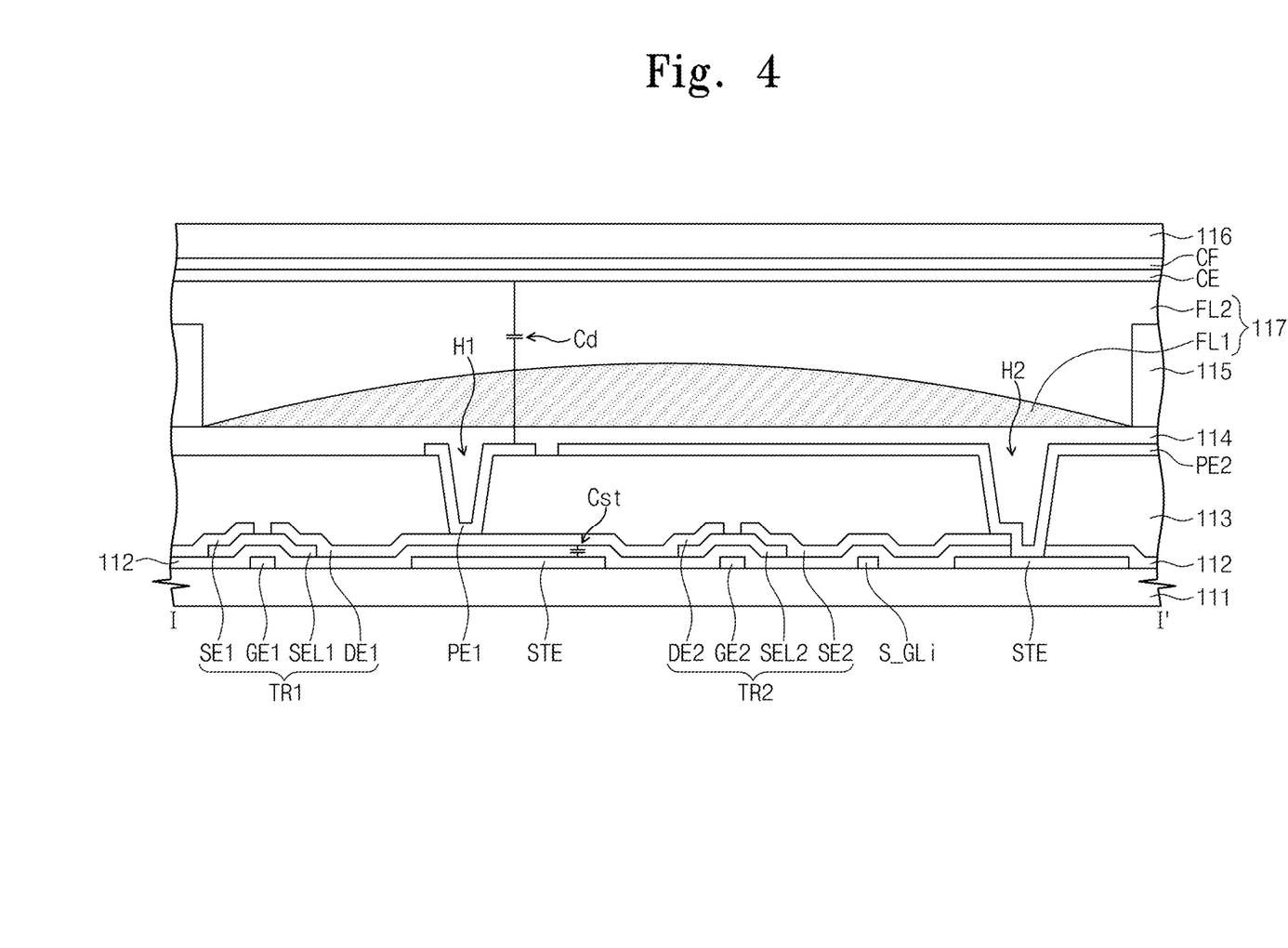
FIG. 4 is a cross-sectional view taken along a line I-I' illustrated in FIG. 3.

Referring to FIGS. 1, 3, and 4, the display panel 110 includes a first substrate 111, a second substrate 116 facing the first substrate 111, and a fluid layer 117 interposed between the first and second substrates 111 and 116.

Each of the first and second substrates 111 and 116 may be, but not limited to, a glass substrate or a plastic substrate. In one or more embodiments, the first and second substrates 111 and 116 are the plastic substrate. In one or more embodiments, the first and second substrates 111 and 116 may include one or more of polyethylene terephthalate PET, fiber reinforced plastic, polyethylene naphthalate PEN, etc. In one or more embodiments, the first and second substrates 111 and 116 may be substantially flexible.

The fluid layer 117 includes a first fluid layer FL1 and a second fluid layer FL2. The first fluid layer FL1 is a non-polar fluid layer and/or has hydrophobicity. For example, the first fluid layer FL1 (or a black fluid layer) may include a light-absorbing material (such as a black dye) for absorbing an incident light. The first fluid layer FL1 may spread over an entire area of the pixel PX and may move to a portion of the pixel PX, serving as a shutter for blocking or permitting light. The second fluid layer FL2 has hydrophilicity and/or a polarity. For example, the second fluid layer FL2 may include water and/or electrolyte solution. The second fluid layer FL2 may transmit incident light. The first and second fluid layers FL1 and FL2 have different specific densities, and the first and second fluid layers FL1 and FL2 are immiscible with each other; therefore, the first and second fluid layers FL1 and FL2 are separated from each other with respect to an interface therebetween.

The pixel PX is connected to the gate line GLi, the sub-gate line S_GLi, and the data line DLj. The pixel includes the first thin film transistor TR1, the second thin film transistor TR2, the first pixel electrode PE1, and a second pixel electrode PE2.

The gate line GLi extends in a first direction D1, and the sub-gate line S_GLi extends in parallel with the gate line GLi. The data line DLj extends in a second direction D2 that is substantially perpendicular to the first direction D1. The data line DLj crosses the gate line GLi and the first sub gate line S_GLi and is (at least electrically) insulated from the gate line GLi and the sub-gate line S_GLi.

The pixel PX may further include the storage line SL to which the storage voltage is applied. In one or more embodiments, the storage line SL may be formed on a same layer as the gate line GLi. The storage line SL may be arranged in parallel with the gate line GLi between the gate line GLi and the sub gate line S_GLi.

The first gate electrode GE1 (which is a part of the first thin film transistor TR1) is branched (or protrudes) from the gate line GLi. The first source electrode SE1 (which is a part of the first thin film transistor TR1) is branched (or protrudes) from the data line DLj. The first drain electrode DE1 (which is a part of the first thin film transistor TR1) is electrically connected to the first pixel electrode PE1 through a first contact hole H1. A storage electrode STE is branched (or protrudes) from the storage line SL.

The second gate electrode GE2 (which is a part of the second thin film transistor TR2) is branched (or protrudes) from the sub gate line S_GLi. The second source electrode SE2 (which is a part of the second thin film transistor TR2) extends to a second contact hole H2 and is electrically connected to the second pixel electrode PE2 through the second contact hole H2. The second drain electrode DE2 (which is part of the second thin film transistor TR2) extends from the first drain electrode DE1 (which is a part of the first thin film transistor TR1).

The second pixel electrode PE2 is electrically connected to the second source electrode SE2 and the storage electrode STE through the second contact hole H2.

The pixel partition wall 115 that separates the pixels PX may be formed along the gate lines GL1 to GLn and the data lines DL1 to DLm.

The pixel PX may further include a first area 118 in which the first pixel electrode PE1 and the second pixel electrode PE2 are not formed.

Referring again to FIG. 4, the first gate electrode GE1 (which is a part of the first thin film transistor TR1), the storage electrode STE, and the second gate electrode GE2 (which is a part of the second thin film transistor TR2) are formed on the first substrate 111. In one or more embodiments, a gate insulating layer 112 is formed on the first substrate 111 to cover the first gate electrode GE1, the storage electrode STE, the second gate electrode GE2.

A first semiconductor layer SEL1 is formed on a portion of the gate insulating layer 112 that covers the first gate electrode GE1, and a second semiconductor layer SEL2 is formed on a portion of the gate insulating layer 112 that covers the second gate electrode GE2. Although not illustrated in FIG. 4, each of the first and second semiconductor layers SEL1 and SEL2 may include an active layer and an ohmic contact layer.

The first source electrode SE1 and the first drain electrode DE1 (which are parts of the first thin film transistor TR1) are formed on (or overlap) the first semiconductor layer SEL1 and the gate insulating layer 112 and are spaced apart from each other The second drain electrode DE2 and the second source electrode SE2 (which are parts of the second thin film transistor TR2) are formed on (or overlap) the second semiconductor layer SEL2 and the gate insulating layer 112 and are spaced apart from each other. The second drain electrode DE2 extends from the first drain electrode DE1 (which is a part of the first thin film transistor TR1). The storage electrode STE forms the storage capacitor Cst in cooperation with at least one of the second drain electrode DE2 and the first drain electrode DE1. The second source electrode SE2 extends to the second contact hole H2 and is electrically connected to the second pixel electrode PE2.

The first source electrode SE1, the first drain electrode DE1, the second drain electrode DE2, and the second source electrode SE2 are covered by a protective layer 113. Although not illustrated in FIG. 4, the data lines DL1 to DLm are formed on the gate insulating layer 112 and covered by the protective layer 113. The first pixel electrode PE1 and the second pixel electrode PE2 are formed on the protective layer 113 and are spaced apart from each other.

The first pixel electrode PE1 is electrically connected to the first drain electrode DE1 (which is a part of the first thin film transistor TR1) through the first contact hole H1, which is formed through the protective layer 113. Since the second drain electrode DE2 extends from the first drain electrode DE1, the first pixel electrode PE1 is electrically connected to the second drain electrode DE2 (which is a part of the second thin film transistor TR2) through the first contact hole H1.

The second pixel electrode PE2 is electrically connected to the storage electrode STE and the second source electrode E2 through the second contact hole H2, which is formed through the protective layer 113 and the gate insulating layer 112.

Each of the first pixel electrode PE1 and the second pixel electrode PE2 may include a transparent conductive material, such as one or more of indium tin oxide ITO, indium zinc oxide IZO, a conductive polymer, and carbon nanotube CNT, etc.

An insulating layer 114 (e.g., a hydrophobic insulating layer) is formed on the protective layer 113 to cover the first pixel electrode PE1 and the second pixel electrode PE2. A surface of the insulating layer 114 may be surface-treated to have a hydrophobic property and/or an additional hydrophobic layer (not illustrated) may be formed on the protective layer 113 to provide a hydrophobic property.

When no voltage is applied to the pixel PX, the insulating layer 114 may have the hydrophobic property. Nevertheless, when a voltage is applied to the pixel PX, the insulating layer 114 may have a hydrophilic property. The state in which the voltage is applied to the pixel PX may indicate that there is a voltage level difference between the voltages applied to the first and second pixel electrodes PE1 and PE2 and the voltage applied to the common electrode CE.

The pixel partition wall 115 (illustrated in FIGS. 3 and 4) that separates the pixels PX is formed on the insulating layer 114. The pixel partition wall 115 may be arranged along the gate lines GL1 to GLn and the data lines DL1 to DLm. The pixel partition wall 115 may be formed using photolithography. The pixel partition wall 115 may be formed of one or more insulating materials, e.g., one or more of silicon nitride (SiNx), silicon oxide (SiOx), etc.

A color filter CF is formed on the second substrate 116. The color filter CF may be associated with one or more color pixels for displaying one or more of red, green, and blue colors.

The common electrode CE is disposed on the color filter CF. The common electrode CE may include a transparent conductive material, such as indium tin oxide ITO. The common electrode CE faces the first and second pixel electrodes PE1 and PE2 and receives the common voltage Vcom. The first pixel electrode PE1 forms the display capacitor Cd in cooperation with the common electrode CE.

The first fluid layer FL1 is disposed on the insulating layer 114 (which has the hydrophobic property) and is confined by the pixel partition wall 115. The second fluid layer FL2 is disposed on the first fluid layer FL1.

In one or more embodiments, the first fluid layer FL1 may include a material (e.g., a dye) for displaying one of red, green, and blue colors. In one or more embodiments, the electrowetting display device 100 may not include the color filter CF.

In one or more embodiments, as illustrated in FIG. 4, the electrowetting display device 100 may be a transmissive display device. In one or more embodiments, the electrowetting display device 100 may be a reflective display device.

In one or more embodiments, the electrowetting display device 100 may be a reflective display device that includes a reflective layer for reflecting incident light. The reflective layer may be formed on the first and second pixel electrodes PE1 and PE2 or may be formed under the first substrate 111.

In one or more embodiments, the electrowetting display device 100 may not include an additional reflective layer; nevertheless, at least one of the first and second pixel electrodes PE1 and PE2 may be formed of a reflective metal, such as aluminum Al, to reflect incident light.

The electrowetting display device 100 may display a graysale by controlling the movement of the first and second fluid layers FL1 and FL2 using the voltage level difference between the voltages applied to the first and second pixel electrodes PE1 and PE2 and the voltage applied to the common electrode CE.

Since the voltages are applied to the first and second pixel electrodes PE1 and PE2 by the first and second thin film transistors TR1 and TR2, the movement of the first and second fluid layers FL1 and FL2 may be controlled by the first and second thin film transistors TR1 and TR2.

When the reset voltage is applied to the second pixel electrode PE2 and when the common voltage Vcom is applied to the common electrode CE, the first fluid layer FL1 may move to a pixel area including an area where the second pixel electrode PE2 is formed.

In one or more embodiments, the second thin film transistor TR2 may overlap the second pixel electrode PE2. When the first fluid layer FL1 moves to t overlap the second pixel electrode PE2, the second thin film transistor TR2 may overlap the first fluid layer FL1. In one or more embodiments, the first and second thin film transistors TR1 and TR2 may overlap the first fluid layer FL1. Hereinafter, the operation of the pixel will be further discussed.

Figure 5:
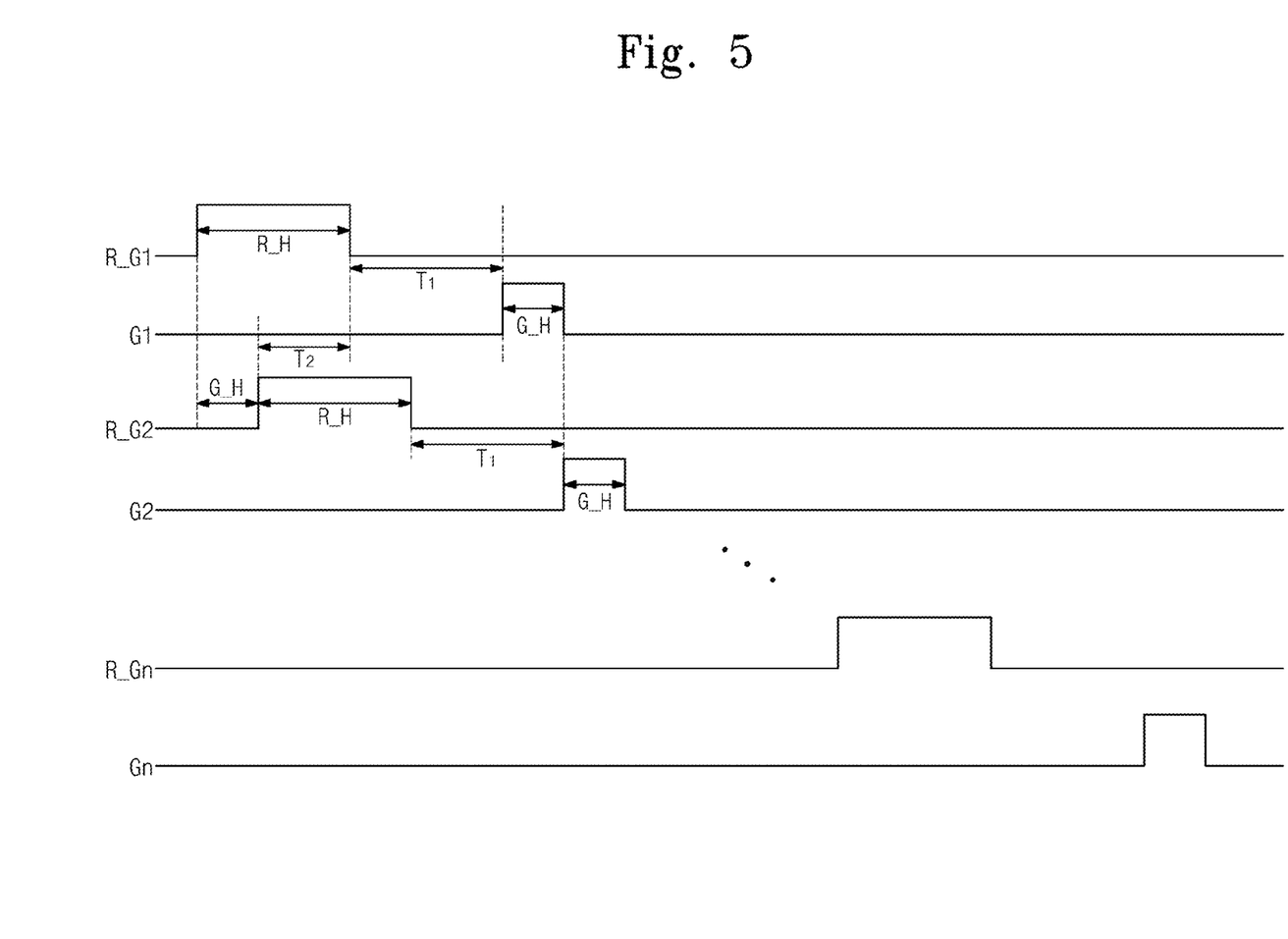
FIG. 5 is a timing diagram of a reset gate signal and a gate signal applied to the pixel.
Figure 6:
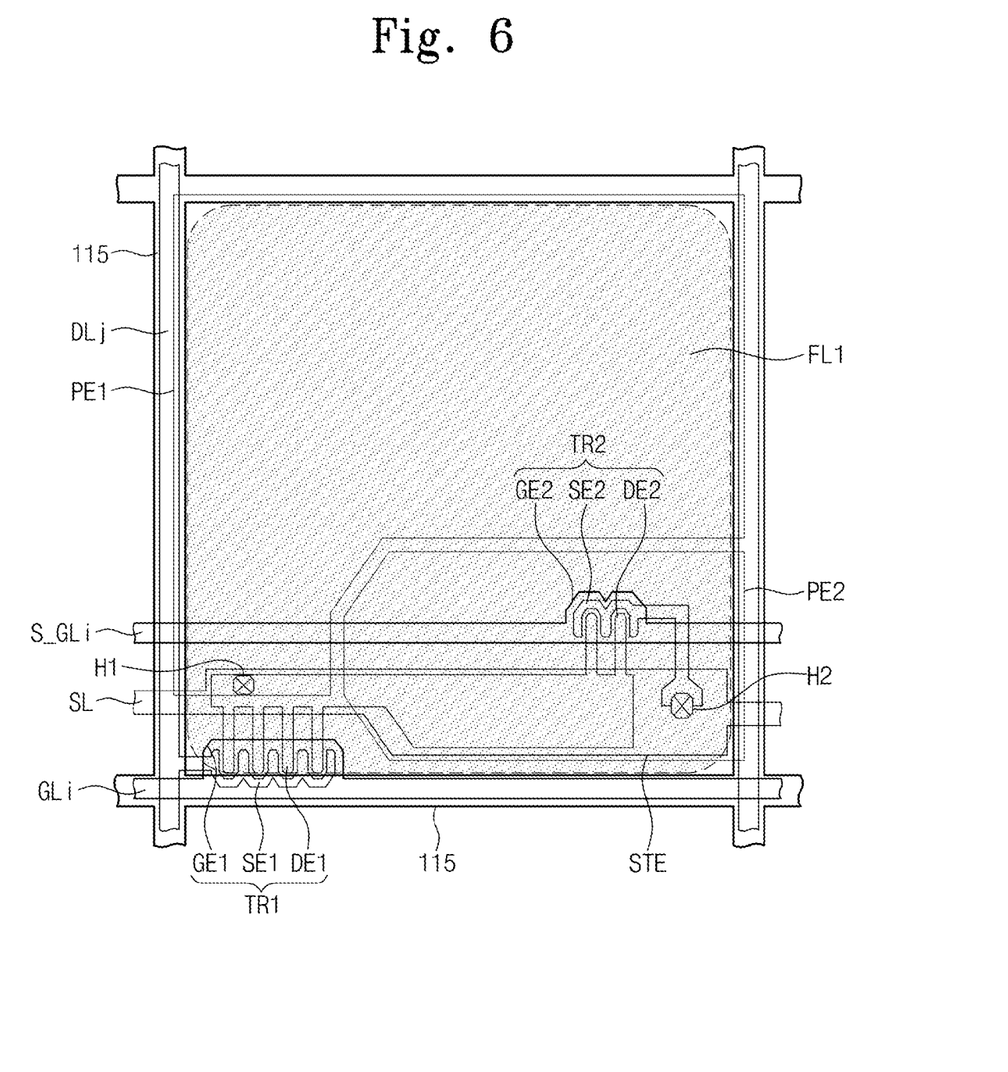
FIG. 6 is a plan view illustrating a fluid layer in a pixel when a reset gate signal is applied to the pixel.
Figure 7:
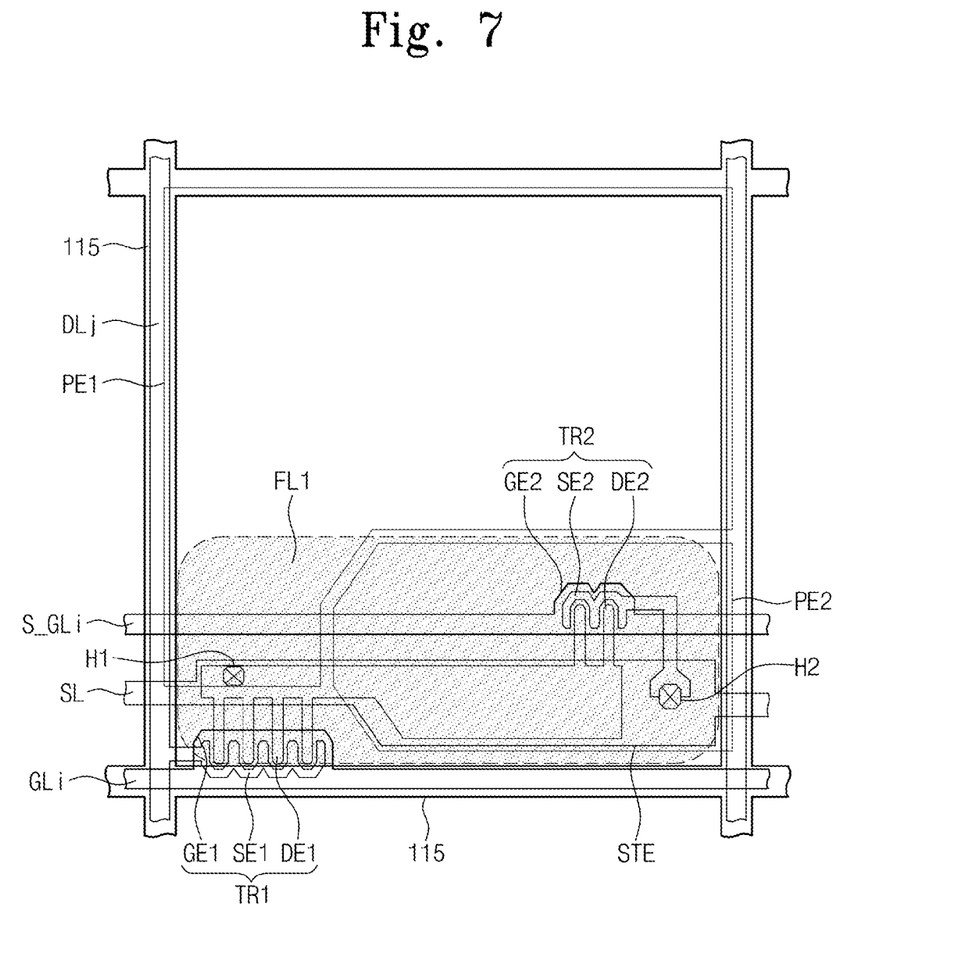
FIG. 7 is a plan view illustrating a fluid layer in a pixel when a gate signal is applied to the pixel.

FIG. 5 is a timing diagram illustrating the reset gate signal and the gate signal that are applied to pixels in one frame. FIG. 6 is a plan view illustrating the first fluid layer FL1 of the pixel when the reset gate signal is applied to the pixel. FIG. 7 is a plan view illustrating the first fluid layer FL1 of the pixel when the gate signal is applied to the pixel.

The operation and features of other pixels of the electrowetting display device 100 may be substantially the same as or analogous to the operation and features of the pixel illustrated in FIGS. 6 and 7. Referring to FIGS. 5 and 6, in every frame, the reset gate signals R_G1 to R_Gn are sequentially applied to the pixels row by row, the gate signals G1 to Gn are sequentially applied to the pixels row by row, and a reset gate signal proceeds each gate signal with a predetermined time interval T1 separating the reset gate signal and the gate signal.

For instance, the first reset gate signal R_G1 is applied to the first row of pixels PX through the first sub-gate line S_GL1. Subsequently, after the predetermined time interval T1 has elapsed following the completion of the first reset gate signal R_G1, the first gate signal G1 is applied to the first row of pixels PX through the first gate line GL1.

In one or more embodiments, the high level period R_H of the reset gate signals R_G1 to R_Gn may be set longer than the high level period G_H of the gate signals G1 to Gn. In one or more embodiments, the high level period R_H of the reset gate signals R_G1 to R_Gn and the high level period G_H of the gate signals G1 to Gn may be optimized for application of the reset voltage and the data voltage. In the one or more embodiments, the high level period G_H of each of the gate signals G1 to Gn may be set to about 7.5 μs, and the high level period R_H of each of the reset gate signals R_G1 to R_Gn may be set to be larger than 50 μs and smaller than a response time of the electrowetting display device 100.

If the high level period R_H of the reset gate signals R_G1 to R_Gn is larger than the response time of the electrowetting display device 100, an observer may recognize an undesirable black gray-scale displayed on a display screen. Thus, the high level period R_H of the reset gate signals R_G1 to R_Gn is set to be smaller than the response time of the electrowetting display device 100 in one or more embodiments.

In one or more embodiments, the size of the second thin film transistor TR2 is smaller than the size of the first thin film transistor TR1. In general, a size of a transistor is proportional to a size of a channel formed between a source electrode and a drain electrode of the transistor. Since the high level period R_H of the reset gate signals R_G1 to R_Gn is set to be longer than the high level period G_H of the gate signals G1 to Gn, a sufficient voltage level may be applied to the pixel PX even though the size of the second thin film transistor TR2 is smaller than that of the first thin film transistor TR1.

In one or more embodiments, a reset gate signal in a present stage (or in a present sub-gate line) may be output in synchronization with a falling edge of a reset gate signal in a previous stage (or in a neighboring sub-gate line assigned a smaller serial number). In one or more embodiments, a gate signal in a present stage (or in a present gate line) may be output in synchronization with a falling edge of a gate signal in the previous stage (or in a neighboring sub-gate line assigned a smaller serial number). Nevertheless, if a reset gate signal in a present stage is in synchronization with a falling edge of a reset gate signal in a previous stage and if a gate signal in the present stage is in synchronization with a falling edge of a gate signal in the previous stage, an interval between the reset gate signal and the gate signal becomes smaller. As a result, the reset gate signal and the gate signal applied to the same row of pixels PX may tend to overlap each other, or the gate signal may be applied to the row of pixels PX earlier than the reset gate signal. In order to prevent the above-mentioned phenomenon, a reset gate signal in a present stage may be output not in synchronization with a falling edge of a reset gate signal in a previous stage, and/or a gate signal in the present stage may be output not in synchronization with a falling edge of a gate signal in the previous stage, and each of the reset gate signals R_G1 to R_Gn is output earlier than a corresponding gate signal of the gate signals G1 to Gn by the predetermined time interval T1.

In one or more embodiments, the predetermined time interval T1 may be in a range from about 0.8 ms to about 1.0 ms. The remaining reset gate signals R_G2 to R_Gn and the gate signals G2 to Gn may be applied to corresponding rows of the pixels PX analogously in view of R_G1 and G1.

In one or more embodiments, two reset gate signals applied to two neighboring sub-gate lines (or applied to neighboring rows of pixels PX) may overlap each other for a predetermined time period T2 (hereinafter referred to as an overlap period). For example, the first reset gate signal R_G1 may be applied to the first row of pixels PX through the first sub-gate line S_GL1. Subsequently, a second reset gate signal R_G2 may be applied to the second row of pixels PX through the second sub-gate line S_GL2 and may overlap the first reset gate signal R_G1 for the overlap period T2.

In one or more embodiments, the second reset gate signal R_G2 may be obtained by shifting (or delaying) a copy of the first reset gate signal R_G1 by the high level period G_H of the gate signal. Thus, the overlap period T2 may be a difference between the high level period R_H of the first reset gate signal R_G1 and the high level period G_H of the first gate signal G1. The remaining reset gate signals may be applied to the pixels PX in an analogous way. Accordingly, a gate signal in the present stage may be output in synchronization with a falling edge of a gate signal in the previous stage.

In one or more embodiments, the pixels PX of the electrowetting display device 100 may have substantially the same or analogous circuit configurations and functions; therefore, the following description related to the operation of a pixel receiving the first reset gate signal R_G1 and the first gate signal G1 discussed with reference to FIGS. 2-7 may be substantially applicable to other pixels of the electrowetting display device.

The first reset gate signal R_G1 may be applied to the second gate electrode GE2 (which is a part of the second thin film transistor TR2 in the reset circuit 30) through the first-sub-gate line S_GL1. The second thin film transistor TR2 is turned on during the high level period R_H of the first reset gate signal R_G1. The reset voltage is applied to the storage line SL. Therefore, the second pixel electrode PE2 connected to the storage electrode STE branched from the storage line SL and the second source electrode SE2 (which is a part of the second thin film transistor TR2) are provided with the reset voltage through the storage electrode STE.

Since the second thin film transistor TR2 is turned on, a current flows from the second source electrode SE2 to the second drain electrode DE2. As a result, the second drain electrode DE2 receives the reset voltage. The second drain electrode DE2 is connected to the first pixel electrode PE1 through the first contact hole H1, and thus the first pixel electrode PE1 receives the reset voltage through the second drain electrode DE2.

Consequently, the reset voltage is applied to the first pixel electrode PE1 and the second pixel electrode PE2. The common electrode CE receives the common voltage Vcom. The reset voltage has the same voltage level as the common voltage Vcom. Thus, the first pixel electrode PE1, the second pixel electrode PE2, and the common electrode CE receive the same voltage.

Therefore, no electric field is formed between the first pixel electrode PE1 and the common electrode CE and between the second pixel electrode PE2 and the common electrode CE. That is, the pixel PX is substantially in a state in which no voltage is applied thereto. As a result, the first fluid layer FL1 (confined by the partition wall 115) spreads on the insulating layer 114 and spreads over the entire area of the pixel PX, so that the pixel PX displays the black gray-scale.

The first fluid layer LF1 acts as a shutter by the control of the second thin film transistor TR2.

In a previous frame, according to a data voltage applied to the pixel PX, the first fluid layer FL1 may have moved away from a substantial portion of the pixel area and may have covered only a portion of the pixel area (including an area where the second pixel electrode PE2 is located), wherein the data voltage may have been applied to the pixel PX in response to a gate. As an example, the first fluid layer FL1 may have moved to a lower portion of the pixel PX including the area where the second pixel electrode PE2 is located.

In order to prevent the back-flow phenomenon (discussed the Background section), the reset voltage may be applied to the pixel PX for initializing the pixel PX before a data voltage is applied to the pixel PX in the present frame. In one or more embodiments, the reset voltage is applied to the pixel PX to initialize the pixel PX before a data voltage is applied in every frame.

Referring to FIGS. 5 and 7, the first reset gate signal R_G1 is applied to the pixel PX, and the first gate signal G1 is applied to the first gate electrode GE1 (which is a part of the first thin film transistor TR1) after a predetermined time interval $T_1$ following the falling edge of the first reset gate signal R_G1 has elapsed. The first thin film transistor TR1 is turned on during the high period G_H of the first gate signal G1. Thus, a first data voltage is applied to the pixel PX through the first data line DL1 (an example for the data line DLj).

Since the first thin film transistor TR1 is in the turned-on state, a current flows from the first source electrode SE1 (which is branched from the first data line DL1) to the first drain electrode DE1. That is, the first drain electrode DE1 receives the data voltage.

Since the first drain electrode DE1 is connected to the first pixel electrode PE1 through the first contact hole H1, the first pixel electrode PE1 receives the data voltage through the first drain electrode DE1.

The first pixel electrode PE1 receives the data voltage, and the common electrode CE receives the common voltage Vcom. Therefore, an electric field is formed between the first pixel electrode PE1 and the common electrode CE, and the pixel PX is charged with the applied data voltage. That is, the display capacitor Cd of the pixel PX is charged with the data voltage.

Given that the electric field is formed between the first pixel electrode PE1 and the common electrode CE, a portion of the insulating layer 114 that overlaps the first pixel electrode PE1 has a hydrophilic property. As a result, a surface tension of the second fluid layer FL2 (which as hydrophilicity) is changed, and the second fluid layer FL2 extends to contact a portion of the insulating layer 114 that overlaps the first pixel electrode PE1, thereby pushing the first fluid layer FL1 away such that the first fluid layer FL1 covers only a portion of the pixel PX.

In one or more embodiments, the second pixel electrode PE2 is connected to the storage electrode STE through the second contact hole H2 and receives the reset voltage through the storage electrode STE. The reset voltage applied to the second pixel electrode PE2 has the same voltage level as the common voltage Vcom that is applied to the common electrode CE. Since no voltage difference exists between the second pixel electrode PE2 and the common electrode CE, no electric field is formed between the second pixel electrode PE2 and the common electrode CE. Thus, a portion of the insulating layer 114 that overlaps the second pixel electrode PE2 has a hydrophobic property.

In addition, since no voltage is applied to the first area 118 (illustrated in FIG. 3), which do not overlap the first and second pixel electrodes PE1 and PE2, no electric field is generated in the first area 118. Thus, the portion of the insulating layer 114 that corresponds to the first area 118 has the hydrophobic property. As a result, the first fluid layer FL1 may be collected in a portion of the pixel PX corresponding to the first area 118 and the second pixel electrode PE2. In one or more embodiments, the first thin film transistor TR1 may overlap the area where the first fluid layer FL1 is collected.

In one or more embodiments, the area where the first fluid layer FL1 is collected may include a portion of the pixel PX where a portion of the first pixel electrode PE1 is formed in accordance with the amount and other characteristics of the first fluid layer FL1. As an example, the first layer FL1 may include oil, which tends to be collected in a circular shape. As illustrated in FIG. 7, the area where the first fluid layer FL1 is collected may correspond to the second pixel electrode PE2, the first area 118, and a portion of the first pixel electrode PE1 adjacent to the second pixel electrode PE2.

In one or more embodiments, the first and second thin film transistors TR1 and TR2 may overlap the area where the first fluid layer FL1 is collected, as illustrated in FIG. 7.

Accordingly, the first fluid layer FL1 is pushed to only a portion of the pixel PX by the control of the first thin film transistor TR1, the incident light transmits through the second fluid layer FL2, and thus the pixel PX displays a desired image portion. Controlled by the corresponding first thin film transistor, each pixel PX displays a desired gray-scale in accordance with the data voltage applied to the pixel PX.

The first fluid layer FL1 may absorb the incident light. Therefore, the portion of the pixel PX where the first fluid layer FL1 is collected does not transmit the incident light.

As illustrated in FIG. 7, the second thin film transistor TR2 (which is a part of the reset circuit 30) may overlap the area where the first fluid layer FL1 is collected. Thus, the second thin film transistor TR2 may not affect the transmittance of the incident light, and the transmittance of the electrowetting display device 100 may not be reduced by the second thin film transistor TR2.

Additionally or alternatively, the first thin film transistor TR1 may overlap the area where the first fluid layer FL1 is collected. Thus, the transmittance of the electrowetting display device 100 may not be reduced by the first thin film transistor TR1.

According to embodiments of the invention, the reset gate signal and the gate signal may be set to have the optimal time periods for applying the reset voltage and the data voltage, respectively.

According to embodiments of the invention, the frequency of the gate signal does not need to be set higher than the frequency of the gate signal in the conventional liquid crystal display. Therefore, the electrowetting display device 100 may advantageously minimize consumption. The reset gate signal and the gate signal may be set to have optimal time periods (with sufficient lengths) for applying the reset voltage and the data voltage, respectively. Advantageously, the electrowetting display device 100 may provide images with satisfactory resolution.

In addition, at least one of the first thin film transistor TR1 and the second thin film transistor TR2 may be formed in the area where the first fluid layer FL1 is collected. Therefore, although the electrowetting display device 100 includes the reset circuit 30, the electrowetting display device 100 may still have sufficient transmittance.

Although the embodiments of the present invention have been described, it is understood that the present invention should not be limited to these embodiments. Various changes and modifications can be made by one ordinary skilled in the art within the spirit and scope of the present invention as hereinafter claimed.

What is claimed is:

1. A display device comprising:
a plurality of pixels, wherein at least one pixel of the plurality of pixels includes:
a first display capacitor;
a data switching device disposed in a first region of the at least one pixel, the data switching device configured to transmit a data voltage to the first display capacitor in response to an activating gate signal that is applied to the data switching device for an activating gate signal duration, wherein the data switching device includes a first drain electrode and a first source electrode; and
a first reset switching device disposed in a second region of the at least one pixel, the first reset switching device configured to transmit a first storage voltage to the first display capacitor in response to a first activating reset signal that is applied to the first reset switching device for a first activating reset signal duration, wherein
the first reset switching device includes a second drain electrode and a second source electrode,
a size of a second transistor channel between the second drain electrode and the second source electrode is smaller than a size of a first transistor channel between the first drain electrode and the first source electrode, such that the first reset switching device blocks less incident light as compared to the data switching device,
the first storage voltage is configured for resetting the pixel, and
the first activating reset signal duration is longer than the activating gate signal duration.

2. The display device of claim 1, wherein the data switching device is configured to receive the activating gate signal after a wait interval has elapsed following completion of the first activating reset signal duration.

3. The display device of claim 1, further comprising:
a second display capacitor; and
a second reset switching device configured to transmit a second storage voltage to the second display capacitor in response to a second activating reset signal that is applied to the second reset switching device for a second activating reset signal duration,
wherein the second activating reset signal duration overlaps the first activating reset signal duration.

4. The display device of claim 3, wherein a length of a time difference between a rising edge of the second activating reset signal and a rising edge of the first activating reset signal is equal to a length of the activating gate signal duration.

5. The display device of claim 1, wherein a voltage level of the activating gate signal is equal to a voltage level of the first activating reset signal.

6. The display device of claim 1, further comprising a fluid, wherein the fluid is configured to cover the first reset switching device when the data voltage is applied to the first display capacitor.

7. The display device of claim 6, wherein the fluid is a light-absorbing fluid.

8. The display device of claim 6, wherein the fluid is configured to cover both the data switching device and the first reset switching device when the data voltage is applied to the first display capacitor.

9. The display device of claim 6, further comprising a first pixel electrode,
wherein the first pixel electrode is a part of the first display capacitor, wherein the fluid is configured to cover a first area of the first pixel electrode when the first storage voltage is applied to the first display capacitor, and wherein the fluid is configured not to cover the first area of the first pixel electrode when the data voltage is applied to the first display capacitor.

10. The display device of claim 9, wherein the first pixel electrode is electrically connected to both the first drain electrode of the data switching device and the second drain electrode of the first reset switching device.

11. The display device of claim 9,
wherein the fluid is configured to cover a second area of the first pixel electrode when the data voltage is applied to the first display capacitor, and
wherein the first area of the first pixel electrode is larger than the second area of the first pixel electrode.

12. The display device of claim 9, further comprising:
a storage electrode that receives the first storage voltage; and
a second pixel electrode electrically connected to the storage electrode.

13. The display device of claim 12, wherein the second pixel electrode is electrically connected to the second source electrode of the first reset switching device.

14. The display device of claim 12, wherein an edge of the fluid is disposed at a gap between the first pixel electrode and the second pixel electrode in a plan view of the pixel when the data voltage is applied to the first display capacitor.

15. The display device of claim 14, wherein the fluid is configured to overlap the second pixel electrode when the data voltage is applied to the first display capacitor.

16. The display device of claim 12, wherein the first pixel electrode is electrically insulated from the storage electrode.

17. The display device of claim 12, wherein a portion of the fluid overlaps neither of the first pixel electrode and the second pixel electrode when the data voltage is applied to the first display capacitor.

18. The display device of claim 17, wherein the portion of the fluid overlaps the data switching device when the data voltage is applied to the first display capacitor.

19. The display device of claim 12, wherein the second pixel electrode overlaps the first reset switching device.

20. A method for operating a display device, the display device including a display capacitor, a reset switching device, and a data switching device, the method comprising:
providing an activating reset signal to the reset switching device for an activating reset signal duration to enable the reset switching device to transmit a storage voltage to the display capacitor, thereby resetting a pixel associated with the display capacitor, wherein the data switching device includes a first drain electrode and a first source electrode and wherein the reset switching device includes a second drain electrode and a second source electrode; and
after the providing, applying an activating gate signal to the data switching device for an activating gate signal duration to enable the data switching device to transmit a data voltage to the display capacitor, thereby enabling the pixel to display a gray scale,
wherein the first activating reset signal duration is longer than the activating gate signal duration, and
wherein a size of a second transistor channel between the second drain electrode and the second source electrode is smaller than a size of a first transistor channel between the first drain electrode and the first source electrode.

* * * * *